United States Patent [19]

Flasher

[11] 4,335,589
[45] Jun. 22, 1982

[54] GROUNDING STRUCTURES COMPRISING COMPOSITE KNITTED FABRICS

[75] Inventor: Gary L. Flasher, Phoenixville, Pa.

[73] Assignee: Bentley-Harris Manufacturing Co., Lionville, Pa.

[21] Appl. No.: 164,090

[22] Filed: Jun. 30, 1980

[51] Int. Cl.³ .......................... D04B 7/16; D04B 21/00
[52] U.S. Cl. ........................................ 66/202; 66/195; 66/196
[58] Field of Search ................. 66/202, 9 A, 195, 81, 66/196; 139/425 R, 425 A; 55/360, 381, 382

[56] References Cited

U.S. PATENT DOCUMENTS

| | | | |
|---|---|---|---|
| 415,673 | 11/1889 | Kinney | 66/202 UX |
| 1,276,294 | 8/1915 | Waterfield | 66/195 |
| 1,574,422 | 2/1926 | Feind | 55/360 |
| 1,811,081 | 6/1931 | Hartwell | 66/202 UX |
| 2,218,560 | 10/1940 | Stephens | 66/202 UX |
| 2,278,926 | 4/1942 | Hartwell | 66/202 |
| 2,329,994 | 9/1943 | Kingman | 66/202 |
| 2,684,126 | 7/1954 | Doyle | 55/360 |
| 2,761,203 | 9/1956 | DeWitt | 66/202 X |
| 3,699,590 | 10/1972 | Webber et al. | 2/73 |
| 4,287,844 | 9/1981 | Weil | 112/412 |

Primary Examiner—Ronald Feldbaum
Attorney, Agent, or Firm—Dann, Dorfman, Herrell and Skillman

[57] ABSTRACT

A grounding component for dissipating electrostatic charges in bag filters, which is adapted to be attached to the filter bags to extend along the length thereof. The component comprises a pair of telescopically-related knitted tubes formed from stands of electrically-conductive material. Each tube has a number of wales equal to the number of strands and is knitted with a non-run stretch pattern.

3 Claims, 4 Drawing Figures

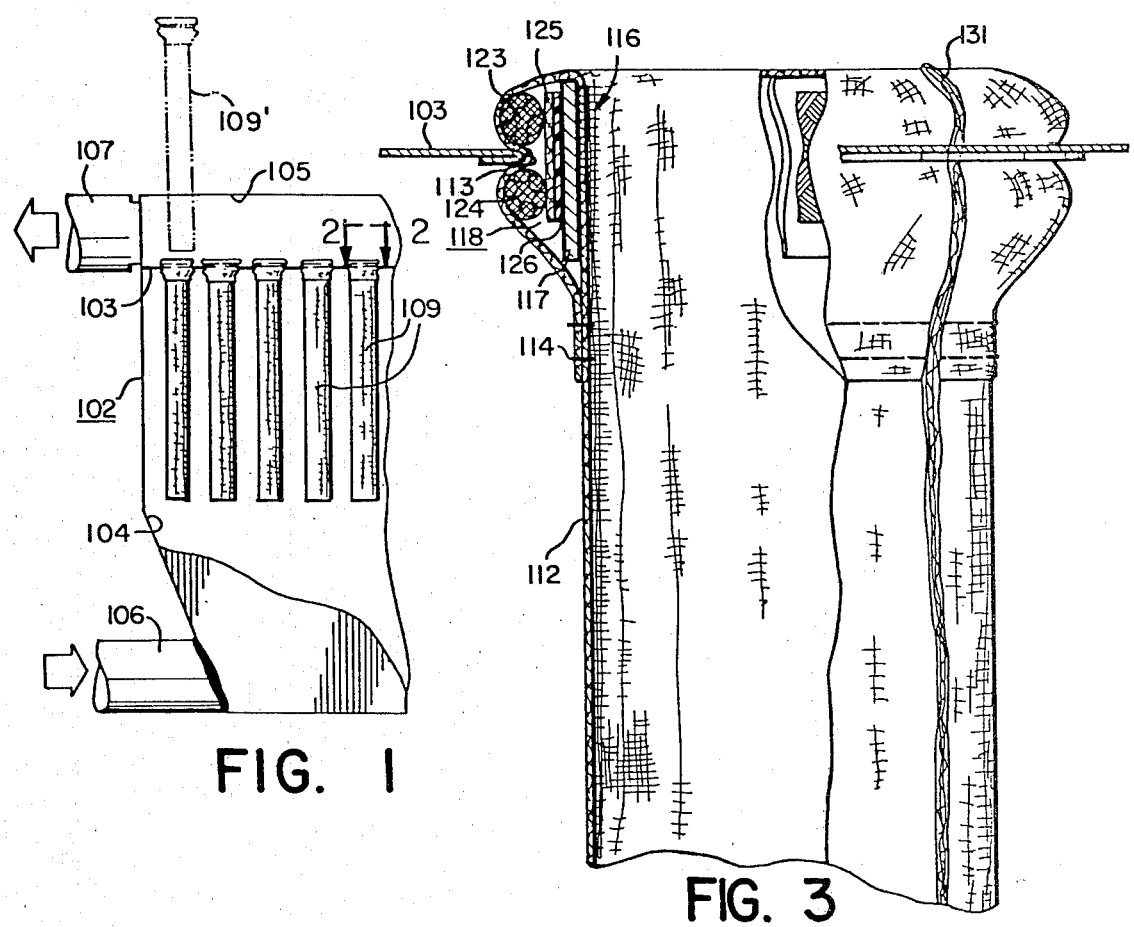
FIG. 1
FIG. 3
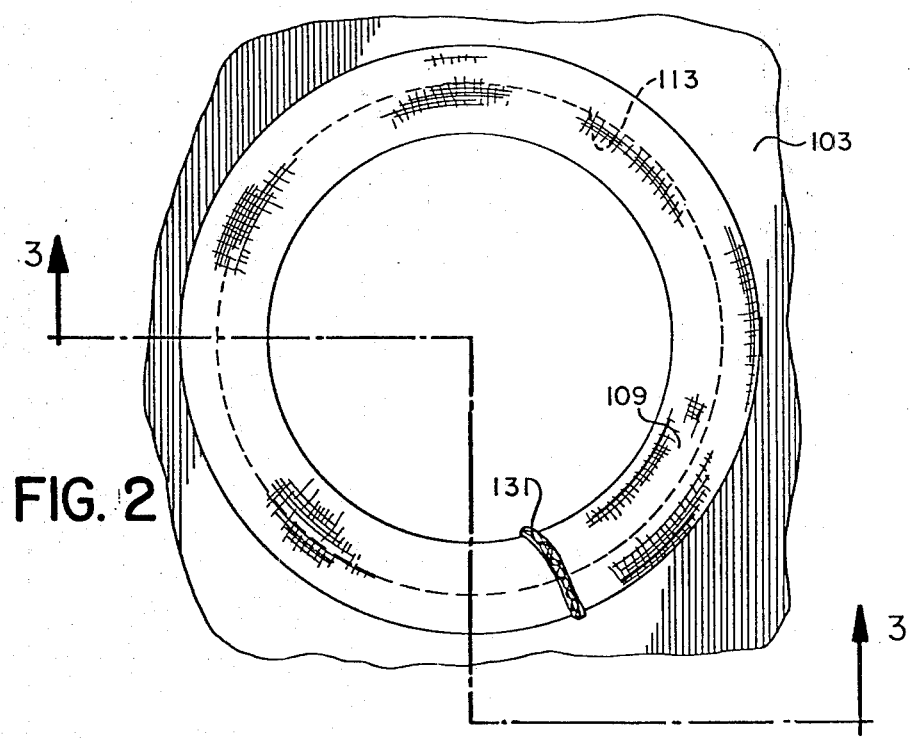
FIG. 2

GROUNDING STRUCTURES COMPRISING COMPOSITE KNITTED FABRICS

RELATED APPLICATION

The present application is an improvement upon the invention of an earlier copending application, Ser. No. 032,960, filed Apr. 24, 1979, now U.S. Pat. No. 4,287,844, entitled "Bulky Composite Fabric and Method of Making Same".

FIELD OF THE INVENTION

The present invention relates to structures comprising composite knitted fabrics, and has particular application to grounding structures which require a heat-resistant conductive material which is sufficiently flexible to adapt to various structural configurations, and yet which is relatively inexpensive and sufficiently durable to maintain its integrity under severe conditions of use.

BACKGROUND OF THE INVENTION

Grounding straps for various uses comprise flat strips of conductive metal or twisted or braided strands of conductive wire, depending upon the use which the grounding strap is applied. The flat band has a wide surface exposure and may be used where the flexibility of the strap is not a significant design factor. However, where flexibility is desired, it has been common practice to use solid, twisted, or braided strands of conductive wire.

SUMMARY OF THE PRESENT INVENTION

With the foregoing in mind the present invention provides improved composite knitted fabrics which may be knitted with conductive strands such as wire to produce a grounding element.

More specifically the present invention provides novel structures which effectively utilize the characteristics of knitted fabrics to produce an improved grounding element in an effective and economical fashion.

DESCRIPTION OF DRAWINGS

All of the objectives of the present invention are more fully set forth hereinafter with reference to the accompanying drawings wherein:

FIG. 1 is a schematic cross-section through a bag filter embodying a grounding wire composed of a composite fabric in accordance with the present invention;

FIG. 2 is an enlarged sectional view as seen from the line 2—2 in FIG. 1;

FIG. 3 is an irregular sectional view taken on the line 3—3 of FIG. 2; and

DESCRIPTION OF THE PREFERRED EMBODIMENT

Figure 4:
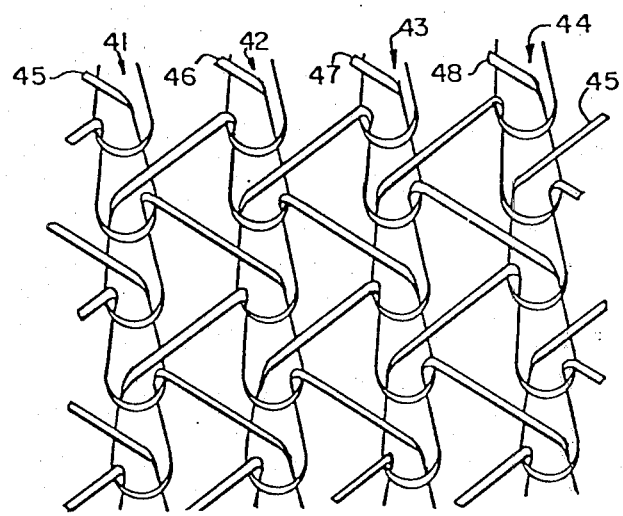
FIG. 4 is a schematic illustration of the stitch pattern embodied in the tubular fabric components of the composite fabric shown in FIGS. 1-3, the tubular fabric being split and opened out to facilitate the illustration of the stitch pattern.

A preferred application of the invention is illustrated in FIGS. 1 through 3 inclusive. In these figures, a bag filter is shown which incorporates a grounding strap made in accordance with the present invention. As shown in FIG. 1, a conventional bag filter comprises a casing 102 having a horizontal partition 103 adjacent the top wall to divide the interior of the casing 102 into a lower pressure chamber 104 and an upper suction chamber 105. A dirty-air inlet 106 introduces dust-laden air into the pressure chamber 104 and an exhaust conduit 107 exhausts clean air from the suction chamber 105. The partition 103 has a plurality of openings therein, conventionally circular in outline, and within each such opening a bag-type filter element is positioned. The filter element comprises a mounting ring adapted to mount the bag within the partition opening and a depending cylindrical tube which is closed at its lower end. Frames may be mounted within the cylindrical tube to maintain it in its annular tubular form so as to provide passageway for air to flow upwardly throughout the entire length of the bag, air entering the bag throughout its length radially inward, and depositing dust or other foreign material on the exterior of the bag. Periodically or intermittently the bag filter operates to dislodge the accumulated dust or other foreign material from the exterior surface of the bag so that it falls into the bottom of the pressure chamber 104 where it may discharged by a suitable dust-discharging device. The dislodgement from the dust from the filter bags may be accomplished pneumatically by causing reverse air flow through the cylindrical bags from inside to out, or may be accomplished mechanically by jogging the bags. After a period of operation the fabric component of the bags tends to become dirt-clogged thereby impairing the efficiency of the filter apparatus and to this end the bags are designed to be readily removed and replaced. In this event, the lid of the dryer casing 102 is opened to permit upward displacement of individual bag elements out of their position in the filter partition 103, as indicated in broken lines at 109' in FIG. 1.

In accordance with the invention of a co-pending application of Thomas A. Weil, the construction of the bag may be simplified to facilitate mounting and dismounting of the bag element 109 from the partition 103. To this end as shown in FIG. 3, the bag member 109 comprises a generally cylindrical bag element 112 composed of a suitable filtration material, in the present instance a woven fabric. The tubular fabric 112 is closed at its lower end and is open at its upper end so as to communicate the interior of the tubular member 109 with the suction chamber 105 at the top of the filter housing above the partition 103.

At the upper end, the bag element 109 is designed to releasably engage with an opening 113 in the partition element 103. As stated above the opening 113 is preferably of circular outline so that the cylindrical tubular bag element 109 fits neatly within the opening 113. At the upper end, the fabric of the bag 109 is turned back on itself and sewn as indicated at 114, embracing a ring member 116 which serves to mount the bag element 109 within the opening 113. The ring member 116 includes an annular wall, in the present instance a spring steel strap 117 formed into a circlet which is slightly smaller in outer diameter than the periphery of the circular opening 113 in the partition 103 so that a limited clearance is provided between the annular wall 117 of the strap and the periphery of the opening 113. A composite fabric 118 is mounted on the outer surface of the annular wall 117 within the clearance space between the wall 117 and the periphery of the opening 113.

The composite fabric 118 comprises a pair of bulky knit tubular components 123 and 124 which are mounted in spaced parallel relationship upon a third component comprising a base fabric 125. In the present instance the base fabric 125 is a woven structure having an elastomeric coating 126 on one surface. The bulky knit tubular components 123 and 124 are secured to the uncoated surface of the fabric 125 by straight lines of stitching (not shown). The elastomeric coating 126, in the present instance serves as a bonding agent to permanently mount the base fabric 125 on the outer surface of the annular wall 117. The mounting device 116 thereby comprises the strap 117 with the composite fabric 118 securely bonded thereto. The mounting device 116 is retained within the hem of the cylindrical tube formed by the turned back portion of the fabric which is sewn to itself at 114. The bulky knit tubular components 123 and 124 are readily compressible and are sufficiently bulky to spring back and engage on opposite sides of the periphery of the opening 113 and the partition 103. The spacing between the components 123 and 124 is selected to correspond to the thickness of the marginal portion of the opening 113 so as to releasably anchor the filter bag 109 in place within the opening 113 of the partition 103.

The filter fabric making up the tube 112 and the components of the composite fabric 118 must be of heat-resistant material in order to avoid deterioration when subjected to the hot gases which pass through the filter casing. Bag filters of this type are frequently used to treat the drying medium in dryers and in such installations the temperature of the gaseous medium to be filtered may be substantially greater than the degradation temperature of normal textile material. Of course, where the gaseous medium being filtered is not subject to high temperature limitations, the textile components of the bag elements may be comprised of standard textile materials. In any event the use of a composite fabric with a plain annular metallic wall of spring steel such as shown in FIG. 3 permits the fabrication of the filter elements in a simple and highly economical fashion and permits the selection of the textile materials which resist the adverse effects of the particular gaseous medium and the entrained foreign matter which is being filtered.

In bag filters of this character, there is frequently a problem which arises due to the generation of static electricity charges on the bag which if not dissipated may create danger of explosion or fire.

To dissipate the electrostatic charge which might otherwise build up on the filter components, grounding means is incorporated into the filter bags which is effective to dissipate any electrostatic charge which might otherwise build up. While standard grounding wires may prove effective, in order to assure the dissipation of the complete charge the grounding wire should present a large surface exposure to the gaseous flow. A single strand of conductive material may tend to become coated with particulate material which is filtered out of the gaseous flow and may lose its efficiency as a grounding means. Likewise if the surface of the grounding element is sufficiently wide, it tends to create a problem due to the stiffness or rigidity of the grounding component which must have sufficient durability to withstand the impacts to which it is subjected during the periodic or intermittent operation of the filter mechanismn to dislodge the accumulated foreign matter from the filter bags. Thus, the present invention provides a grounding element which is possessed of a large area of exposed surface but which also is sufficient flexible and durable to withstand the stresses which are imparted to it when the filter bags are cleaned of their accumulated foreign matter. Furthermore since it is desirable to permanently mount the grounding element within the filter fabric, the grounding element should have a flexibility comparable to the flexibility of the filter fabric in which it is incorporated, and should be of sufficiently open construction to permit attachment of the element to the filter bag, for example by standard sewing techniques.

A suitable grounding element comprises a double thickness of a tubular knit metallic strand which may be fabricated into knit tubes on the same knitter-braider manufactured by the Lamb Knitting Machine Corporation of Chicopee, Massachusetts which is used to form the bulky knit tubes in accordance with the invention of U.S. application Ser. No. 032,960.

With reference to FIG. 4, the Lamb knitter braider is capable of knitting small diameter wire into the stitch pattern shown. The wire is bare of insulation so that the entire surface of the wire is capable of conducting and dissipating electrostatic charges which may otherwise build up in the filter tube, and the continuity of the knitted stitches assures conduction of the charge to a grounding point from any point along the entire length of the grounding element. To this end as shown in FIGS. 2 and 3, the grounding element is shown at 131 and is attached to the fabric 112 of the filter bag 109 and extends throughout the length and is wrapped around the cuff provided by the turned back portion at the top of the cylindrical tube.

In the present instance the grounding element 113 comprises a tube of knitted wire which is knitted in circumscribing relationship to a second tube of knitted wire, both tubes having been formed on the knitter-braider described above and having the stitch pattern shown in FIG. 4. In this case each tube is formed as shown in FIG. 4 with four wales of knitted loops 41, 42, 43 and 44 formed from four strands of wire 45, 46, 47 and 48. In each wale, the loops alternate between two strands of wire, each strand of wire in turn alternating between adjacent wales of needle loops. In the fabrication of the grounding elements, a first knitted tube of wire is formed on the knitter-braider and is collected in a suitable collection can or it may be loosely wound on a package. The strand thus formed is then fed through the hollow cylinder of a subsequent knitter-braider and a second knitted tube is knitted around the previously-knit tube and the two tubes are drawn off together telescopically-related one within the other, and are flattened to form the grounding element shown at 131 in FIGS. 2 and 3. The flattening of the two telescopically-related knitted structures insures surface-to-surface contact between the several strands which compose the grounding element, and the multiple-loop structure afforded by the knitted fabrics insures multiple conductive paths between the strands comprising the grounding component.

The grounding element is not limited to use in a filter system as shown in FIG. 1, but has a wide applicability in other structures which require a grounding element having good electrical conductivity, wide surface exposure, good flexibility and durability under stress, such as required for dissipating electrostatic charges.

While a particular embodiment of the present invention has been herein illustrated and described it is not intended to limit the invention to such disclosure. For example, the grounding component may be knitted as a single component and flattened to provide multiple conductive paths between the loops formed by the strands in diagonally-opposite walls. Other changes and modifications may be made therein and thereto within the scope of the following claims.

I claim:

1. An elongated grounding component particularly adapted for dissipating electrostatic charges, comprising bare strands of electrically-conductive material, said component comprising at least one knitted tube having a given number of wales of needle loops extending longitudinally of said grounding component, any given wale of needle loops having loops alternating in sequence between loops of first and second electrically-conductive strands throughout the length of the grounding component, the first of said strands alternately forming needle loops in a wale on one side of the given wale and the second of said strands alternately forming needle loops in a wale on the other side of said given wale, said tube being flattened to insure intimate electrical contact between the strands of the knitted tube to assure multiple conductive paths between said strands throughout the length of said grounding component.

2. A grounding component according to claim 1 wherein said tube consists of the same number of strands as said given number of wales.

3. A grounding component according to claim 2 wherein said component comprises a pair of said knitted tubes, said tubes being telescopically related.

* * * * *